United States Patent [19]
Koike

[11] Patent Number: 5,713,634
[45] Date of Patent: Feb. 3, 1998

[54] SEAT BACK STRUCTURE OF VEHICLE SEAT

[76] Inventor: Toshihisa Koike, c/o Tachi-S Co., Ltd. 2-12, Matsubaracho 3-chome, Akishima-shi, Tokyo, Japan

[21] Appl. No.: 722,986

[22] Filed: Sep. 30, 1996

[51] Int. Cl.$^6$ ............................ B60N 2/02; B60N 2/48
[52] U.S. Cl. ............. 297/378.13; 297/391; 297/216.12; 297/DIG. 2; 296/65.1
[58] Field of Search ................ 297/391, 378.13, 297/216.12, 452.63, DIG. 2; 296/63, 65.1

[56] References Cited

U.S. PATENT DOCUMENTS

| | | | |
|---|---|---|---|
| 2,859,797 | 11/1958 | Mitchelson | 296/65.1 |
| 3,170,725 | 2/1965 | Komorowski | 296/63 |
| 3,186,763 | 6/1965 | Ferrara | 297/216.12 |
| 4,390,209 | 6/1983 | Izuno et al. | |
| 4,555,140 | 11/1985 | Nemoto | 297/DIG. 2 |
| 4,657,297 | 4/1987 | Ishibashi | 297/378.13 |
| 4,708,385 | 11/1987 | Kondo | 297/378.13 |
| 5,253,924 | 10/1993 | Glance | |

FOREIGN PATENT DOCUMENTS

| | | |
|---|---|---|
| 57-80930 | 5/1982 | Japan. |
| 61-24638 | 2/1986 | Japan. |
| 61-247351 | 11/1986 | Japan. |
| 62-46729 | 2/1987 | Japan. |
| 4-141115 | 5/1992 | Japan. |

*Primary Examiner*—Milton Nelson, Jr.
*Assistant Examiner*—Anthony D. Barfield

[57] ABSTRACT

A seat back structure of a vehicle seat with a headrest provided thereon, in which a blow-molded plastic seat back frame is utilized, with an anchor bracket pre-assembled integrally therein. The headrest is supportively secured on that anchor bracket. A connecting element, such as a locking element, is provided between the anchor bracket and a body of vehicle, so that a load applied to the headrest is dispersed through the anchor bracket and connecting element toward the body of vehicle, which does not require any reinforced elements and designs to the seat back frame per se and thus permits the seat back frame to be made light in weight.

8 Claims, 3 Drawing Sheets

SEAT BACK STRUCTURE OF VEHICLE SEAT

BACKGROUND OF INVENTION

1. Field of the Invention

The present invention relates to a structure of seat back of a vehicle seat wherein a plastic seat back frame is provided in the seat back, which is formed by a blow molding and equipped with a headrest.

2. Description of Prior Art

A light-weight oriented structure of seat back frame has been employed in a seat back of a vehicle seat. For that purpose, as a typical example, the seat back frame is formed by subjecting a plastic material to a blow molding into a hollow structure in an attempt to minimize the weight of seat back frame itself. However, such blow-molded structure of seat back frame itself is found not to provide a sufficient strength and rigidity as a frame, and hitherto, an uneven or concavo-convex wall has been formed in the seat back frame, or alternatively, a reinforcing rib or beam has been formed in the seat back frame, during the blow molding process, with a view to giving a sufficient strength and rigidity thereto.

In particular, provision of a headrest on this sort of seat back frame structure transmits a great load applied to the headrest directly towards the seat back frame per se, and requires increasing the thickness of wall of seat back frame or attaching a large size of metallic reinforcing plate integrally to the seat back frame. Consequently, the blow-molded plastic seat back frame with a headrest has been found defective in its increased weight of frame, leaving thus a difficulty in presenting an optimal light-weight structure.

SUMMARY OF THE INVENTION

In view of the above-stated purpose, it is therefore a primary purpose of the present invention to provide an improved seat back structure of a vehicle seat with a headrest provided thereon, which permits a seat back frame of the seat to be made light in weight and also to be formed with ease.

In order to attain such purpose, a seat back structure in accordance with the present invention is basically comprised of:

- a seat back frame formed by a blow molding into a given contour;
- an anchor bracket means which has been provided integrally in the seat back frame during the blow molding, wherein a headrest is secured in the anchor bracket, and a connecting means for connecting the anchor bracket means to a body of the vehicle,
- wherein a load applied to the headrest is dispersed through the anchor bracket means and connecting means towards the body of vehicle.

Accordingly, such load applied to the headrest is not directly exerted upon the seat back frame, and the seat back frame per se does not need any special reinforced element and design as found in the prior art. Further, since the anchor bracket means has been provided integrally in the seat back frame during the blow molding, there is no need to form or attach any additional securing element in the seat back frame in order to secure the anchor bracket means therein, thus permitting the seat back frame to be formed easily.

Preferably, the seat back frame may be formed from a plastic material, and the anchor bracket and connecting means may be formed from a rigid metallic material.

Preferably, the connecting means may have one end which passes through a hole of seat back frame and is fixed to the body of vehicle.

Also, it may be arranged such that the anchor bracket means has a support means integrally provided thereon, in which support means, a stay of headrest is inserted and supported.

In one aspect of the present invention, the connecting means may comprise a lock means fixed to the anchor bracket means and an engagement means fixed at the body of vehicle, such that the lock means is so operable as to be lockingly engaged with and disengaged from the engagement means, whereby the seat back frame is releasably connected with the body of vehicle by those lock and engagement means so as to permit locking and unlocking of the seat back with respect to the body of vehicle. In this case, preferably, all those lock means, anchor bracket means and engagement means may be formed from a rigid metallic material, and the seat back frame be formed with a hole permitting the engagement means to pass therethrough.

Other features and advantages of the present invention will become apparent from reading of the description hereinafter, with reference to the annexed drawings.

DETAILED DESCRIPTION OF PREFERRED EMBODIMENT OF THE INVENTION

Referring to FIGS. 1 to 5, there is illustrated one example of seat back structure of a vehicle seat that may be contemplated in accordance with the present invention.

Figure 1:
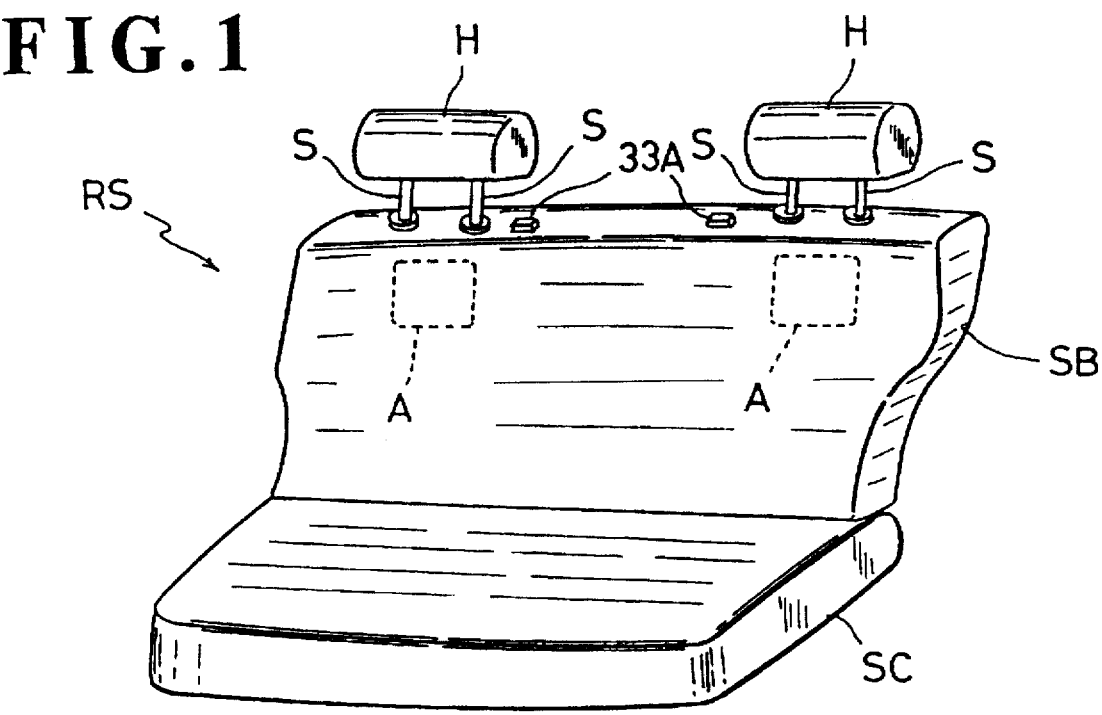
FIG. 1 is a schematic perspective view of a rear seat of a vehicle seat, to which the present invention is applied.
Figure 2:
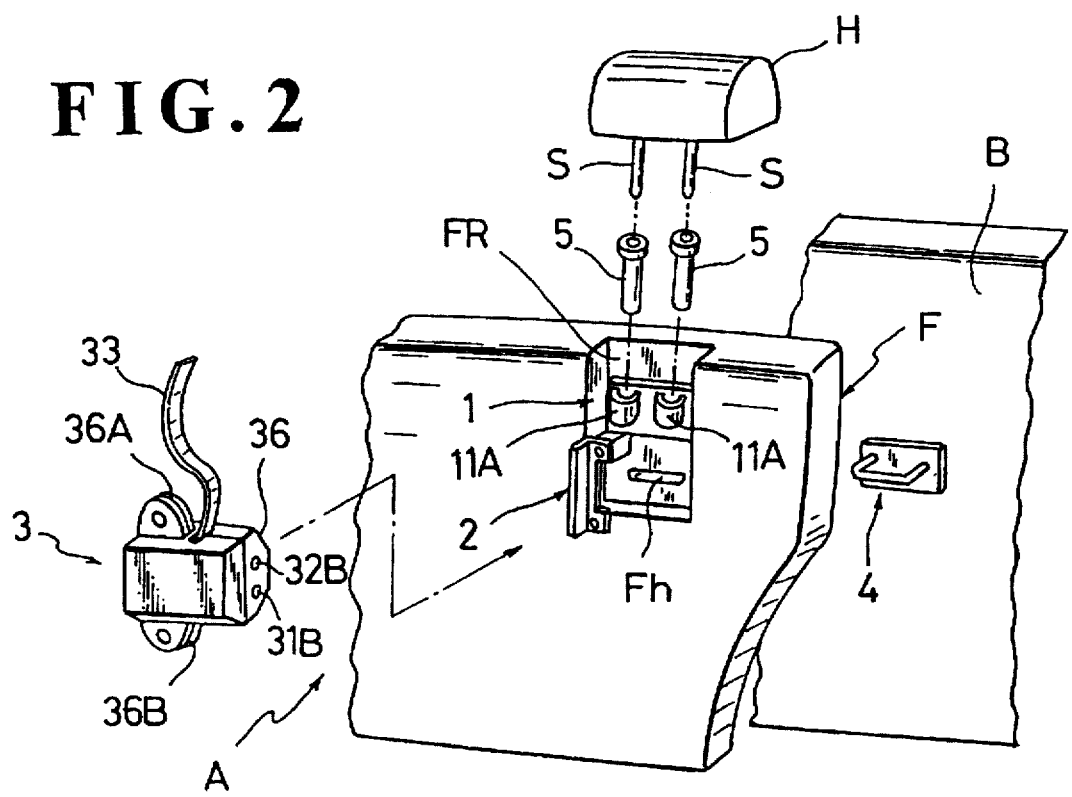
FIG. 2 is a exploded, fragmentary schematic perspective view of the principal parts of seat back structure in accordance with the present invention.

FIG. 1 shows, by way of one example, a rear seat (RS) used in a vehicle or automotive seat, which is of the type equipped with headrests (H). The rear seat (RS) consists of a seat cushion (SC) and a seat back (SB), with two headrests (H)(H) mounted on the seat back (SB).

According to the embodiment shown, the seat back (SB) is of a type foldable onto the seat cushion (SC), which is releasably connected to a generally vertical wall (B) of a vehicle or automobile body. The seat back (SB) is therefore constructed by a plastic seat back frame (F), an upholstery (SB1, SB2) covering the frontal outward sides of the seat back (F), and a pair of lock/anchor assemblies (A), each being designed not only to lock and unlock the seat back (SB) with and from a male engagement member (4) (so-called striker) fixed on the wall (B), but also to securely support the stays (S) of headrest (H).

The seat back frame (F) is formed by a blow molding into a predetermined shape substantially conforming to a contour of seat back (SB) and thus made of a plastic material having a hollow therein, as shown, with a view to making light the whole weight of seat back (SB). In accordance with the present invention, the seat back frame (F) is provided, in its upper local area, with an anchor bracket (1) having an integral support bracket (2) fixed thereto (see FIG. 4). The anchor and support brackets (1)(2) form a part of the lock/anchor assembly (A), but are pre-assembled integrally in the seat back frame (F) by a blow molding. For that purpose, in a blow molding process, the anchor bracket (1) with the support bracket (2) is placed in a blow molding die before a base plastic material is injected and blown therein, and then a blow molding is effected to form the illustrated mode of seat back frame (F) as in FIG. 2 in which both anchor and support brackets (1)(2) have been provided integrally. Further, during the blow molding process, a recessed area (FR) is formed in the upper local area of the resulting seat back frame (F) such as to generally surround those anchor and support brackets (1)(2), with a horizontally elongated hole (Fh) opened in both frontal and back walls of seat back frame (F). The lock/anchor assembly (A) comprises: the foregoing pre-assembled bracket unit of anchor and support brackets (1)(2) integral with the seat back frame (F); a lock assembly (3); and a male engagement member (4) fixed on the vertical wall (B) of vehicle or automobile body.

Figure 3:
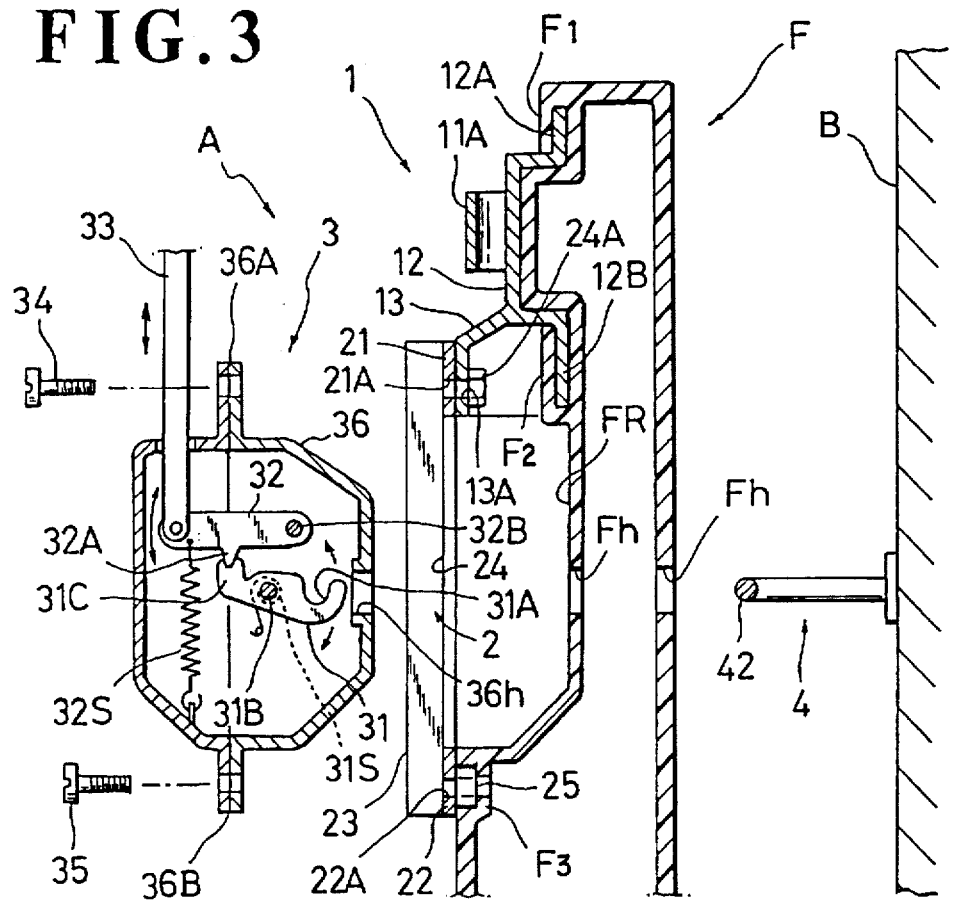
FIG. 3 is a partly broken sectional view of the principal parts of seat back structure.
Figure 4:
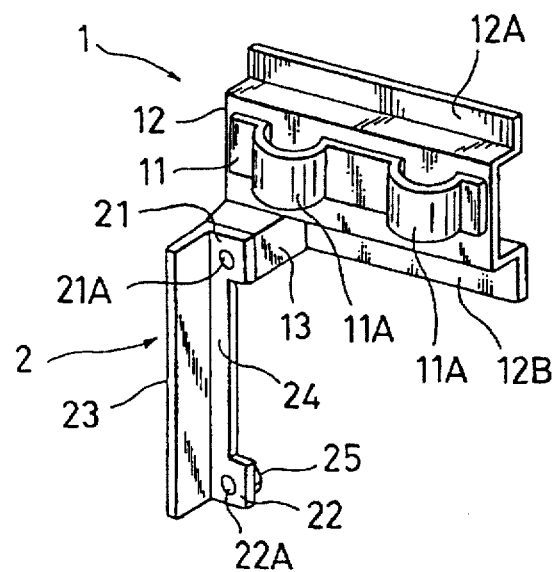
FIG. 4. is a schematic perspective view showing only an integral unit of anchor and support brackets which actually has been provided integrally in a seat back frame in a blow molding process for forming the seat back frame.

With particular reference to FIG. 4, the anchor bracket (1) is formed from a rigid material, such as a steel or other rigid metallic material, which has defined therein, a planar base area (12), a pair of offset anchor leg areas (12A)(12B) and a projected connecting area (13). Designation (11) denotes a headrest securing plate fixed, as by welding, to the planar base area (12) of anchor bracket (1). The securing plate (11) has a pair of spaced-apart semi-circular securing parts (11A)(11A), each being adapted to receive two headrest stay holders (5)(5), respectively. In this respect, the two stays (S)(S) of headrest (H) are respectively inserted in such two holders (5)(5). The support bracket (2) is also formed from a rigid material such as a steel or other rigid metallic material, which is generally of an "L" shape in cross-section, having defined therein, two support walls (23)(24) and a pair of spaced-apart first and second connecting parts (21)(22). As shown, the first connecting part (21) of support bracket (2) may be pre-assembled integrally on the projected connecting area (13) of anchor bracket (1), whereas the second connecting part (22) of the same support bracket (2) is provided with a nut (25) integrally. As best seen in FIG. 3 in conjunction with FIG. 4, both connecting area (13) of anchor bracket (1) and first connecting part (21) of support bracket (2) have their respective holes (13A) and (21A) which are aligned coaxially with each other. A nut (24) is welded fast on the inner side of connecting area (13) in a coaxial alignment with those two holes (13A)(21A).

As stated earlier, the above-constructed integral anchor and support brackets (1)(2) have been attached integrally in a predetermined upper local area of resultant blow-molded plastic seat back frame (F), where the recessed area (FR) is defined. Specifically stated, as understandable from FIGS. 3 and 5, the blow molding has been effected, using a proper die, to control the blowing of a melt base plastic material to embracingly cover both anchor leg areas (12A)(12B) of anchor bracket (1) while at the same time circumscribing the nut (25) integral with the support bracket (2). Designations (F1)(F2) refer to the local securing portions of resulting blow-molded plastic seat back frame (F) in which the two anchor leg areas (12A)(12B) are firmly embedded, and designation (F3) refer to another securing portion of the same seat back frame (F) in which the nut (25) is embedded, excepting its threaded hole.

The lock assembly (3) is of a known construction such that an actuator cam (32) and a lock plate (31) having a female engagement notch (31A) are provided in a housing (36), and that the actuator cam (32) is biased by a spring (32S) in a counterclockwise direction relative to a pin (32B) to normally push the base end (31C) of lock plate (31) downwards, while the lock plate (31) is so urged by a spiral spring (31B) as to rotate clockwise about a pin (31B). The lock plate (31) may be so rotated that its female engagement notch (31A) will be engaged about or disengaged from the horizontal portion (42) of male engagement member (4), as can be seen in FIG. 3. Both two pins (31B)(32B) are fixed at their respective both ends to the housing (36). Therefore, to pull upwardly the strap (33) fixed to the actuator cam (32) will allow the lock plate (31) to rotate clockwise in a direction to disengage from the male engagement member (4). It is noted that the housing (36), actuator cam (32), lock plate (31) and pins (31B)(32B) are all formed from a rigid material, such as a steel or other rigid metallic material. Designation (36h) denotes a horizontally elongated hole formed in the housing (36) of this lock assembly (A), which is equal in shape and size to those (Fh) formed in the seat back frame (F), so that the male engagement member (4) may be inserted through the hole (36h) for access to the lock plate (31) within the housing (36). In this context, all the holes (Fh)(36h) are formed in a size that allows the engagement member (4) to pass freely therethrough.

Figure 5:
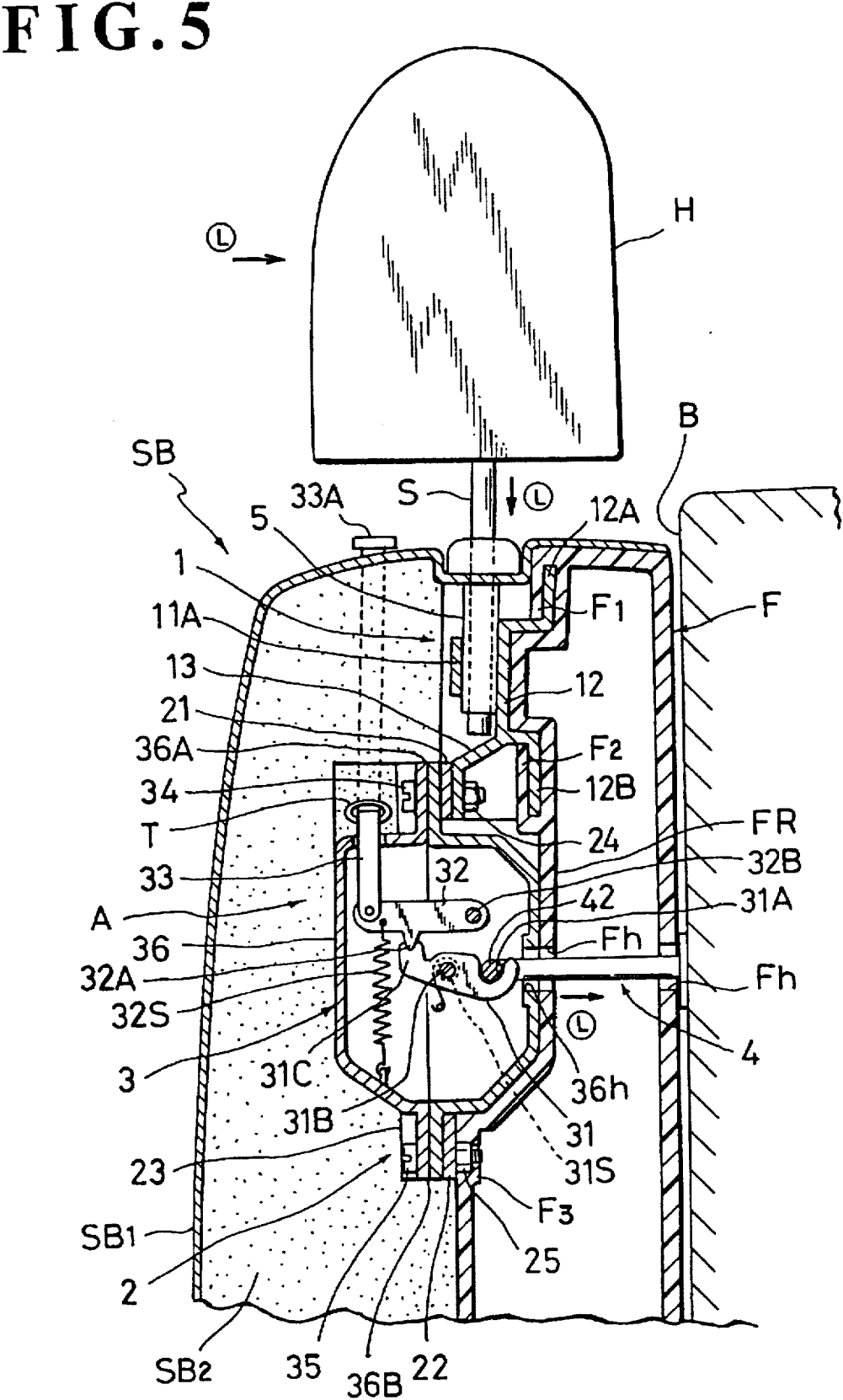
FIG. 5 is a partly broken sectional view of the seat back structure, showing it to be in a locked state to a wall associated with the body of vehicle.

The lock assembly (3) is firmly attached to the support bracket (2) in the seat back frame (F) by passing two securing bolts (34)(35) through the respective two securing leg parts (36A)(36B) of the lock assembly (3) itself as well as the respective juxtaposed securing holes (21A)(13A) and securing hole (22A) which are associated with the bracket unit (1, 2) pre-assembled in the seat back frame (F), and then threadedly fastening the two bolts (34)(35) to the respective two nuts (24)(25), as understandable from FIGS. 3 and 5.

An upholstery is affixed over the frontal outward side of seat back frame (F), overlaying the above-described recessed area (FR) and lock/anchor assembly (A) to provide a finished appearance of seat back (SB) as in FIG. 1. The upholstery may comprise a top cover member (SB1) and a foam cushion member (SB2), as typically known in the art. In this connection, the upholstery is formed with a hole (T) through which the strap (33) movably passes, and a pull tab member (33A) is fixedly connected to the free end of strap (33). As shown, in FIGS. 1 and 5, the pull tab member (33A) is located on the top of seat back (SB).

Also, the two headrest stay holders (5)(5) are secured in the two respective semi-circular parts (11A)(11A) associated with the anchor bracket (1). And, inserted through those two holders (5)(5) are the two stays (S)(S) of headrest (H), respectively, so that the headrest (H) is attached upon the seat back (SB).

The above-constructed seat back (SB) is lockingly attached to the wall (B) of vehicle or automobile by allowing the male engagement member (4) to pass through all the holes (Fh)(36h) of seat back frame (F) and lock assembly (A) and then having the female engagement notch (31A) of lock plate (31) engaged over the horizontal portion (42) of male engagement member (4), as shown in FIG. 5. As desired, the seat back (SB) may be disengaged from the male engagement member (4) by pulling up the strap (33) and folded forwardly onto the seat cushion (SC).

Accordingly, the seat back structure of the present invention has the following advantages:

(i) As shown by the arrows in FIG. 5, most of a load (L) or external force applied to the headrest (H) is transmitted through the rigid lock/anchor assembly (A) to the female engagement member (4). Namely, the load (L) is transmitted through the anchor bracket (1), support bracket (2), pin (31B), lock plate (31) and male engagement member (4) to the wall (B), thereby dispersing most of such load toward the body of vehicle. Indeed, a part of the load (L) is exerted on the seat back frame (F) via the anchor and support brackets (1)(2), but those two brackets (1)(2) and lock assembly (3) themselves serve to disperse such partial load, preventing its intensive local exertion on the seat back frame (F) and thus not affecting the relatively non-rigid nature of frame (F) per se. Hence, the frame (F) is protected against deformation originating from a load (L) applied to the headrest (H) and does not require any special reinforced design as found in the prior art, permitting the frame (F) to be made light in weight.

(ii) Since the anchor and support brackets (1)(2) have been integrally attached in the seat back frame (F) during the blow molding process, there is no need to prepare any other additional separate elements for connecting and securing those brackets (1)(2) as well as the lock assembly (3) and headrest (H), to the seat back frame (F). This materializes an easy and rapid production of the seat back frame (F) and the resultant seat back (SB) itself.

In accordance with the present invention, it should be noted that the abovementioned advantages may be attained by simply connecting the anchor bracket (1) directly to the wall (B) of vehicle without the lock assembly (3) interposed therebetween. The illustrated embodiments are merely dedicated to the foldable type of seat back (SB) which can be locked to a vehicle body at its upright use position and unlocked therefrom so as to be folded onto the seat cushion (SC), but not limitative within the gist of the present invention. In the case where the seat back (SB) is of the type fixed to the vehicle wall (B), then the anchor bracket (1) may be simply formed with an extension for connection with the engagement member (4) or a suitable connecting means equivalent thereto, as a common, non-distinctive mode of alteration within the gist of this invention, although not shown. The present invention is thus not specifically limited to the illustrated embodiment, but any other modifications, replacements and additions may be structurally applied thereto without departing from the scopes of the appended claims.

What is claimed is:

1. A structure of a seat back of a seat for mounting to a body of a vehicle having a headrest attached to the seat back, said structure comprising:

a blow-molded seat back frame having a predetermined contour, said seat back frame including a hole formed therein;

an anchor bracket means fixed in said seat back frame;

wherein said headrest is slidably engaged to said anchor bracket;

a connecting means for locking and connecting said anchor bracket means to said body of the vehicle, said connecting means including a first part immovably fixed to said anchor bracket means and a second part for engagement to said body of the vehicle;

said headrest being spaced apart from said connecting means;

said second part of said connecting means projecting into said hole of said seat back frame and being adapted to engage said first part of said connecting means thereby connecting said seat back frame to said body of the vehicle and permitting a load applied to said headrest to be dispersed through said anchor bracket means and connecting means towards the body of vehicle when said first part is engaged to said body of the vehicle.

2. The structure as defined in claim 1, wherein said seat back frame is formed from a plastic material, whereas said anchor bracket means and connecting means are formed from a rigid metallic material.

3. The structure as defined in claim 1, wherein said anchor bracket means is disposed in an upper local area of said seat back frame, having an area to support a stay of said headrest, and wherein said connecting means is disposed adjacent to said anchor bracket means.

4. The structure as defined in claim 11, wherein said anchor bracket means has a support means integrally provided thereon, in which support means, a stay of said headrest is inserted and supported.

5. The structure as defined in claim 1, wherein a support bracket means is pre-assembled with said anchor bracket means and both are integrally molded in said seat back frame, and wherein said first part of said connecting means is fixedly supported on said support bracket means, while said second part of said connecting means is adapted to be fixed to said body of the vehicle.

6. The structure as defined in claim 1, wherein said first part of said connecting means comprises a lock means fixed to said anchor bracket means and said second part comprises an engagement means adapted to be fixed at said body of said vehicle, wherein said lock means is so operable as to be lockingly engaged with and disengaged from said engagement means, whereby said seat back frame is adapted to be releasably connected with said body of said vehicle by said lock means and engagement means so as to permit locking and unlocking of said seat back with respect to said body of said vehicle.

7. The structure according to claim 6, wherein all said lock means, anchor bracket means and engagement means are formed from a rigid metallic material.

8. The structure according to claim 6, wherein a support bracket means is pre-assembled with said anchor bracket means and both are integrally molded in said seat back frame, and wherein said lock means is fixedly supported on said support bracket means.

* * * * *